(12) United States Patent
Hiraiwa et al.

(10) Patent No.: US 6,874,481 B2
(45) Date of Patent: Apr. 5, 2005

(54) FUEL SUPPLY APPARATUS AND RESIDUAL FUEL AMOUNT INDICATION DEVICE FOR FUEL SUPPLY APPARATUS

(75) Inventors: Masaru Hiraiwa, Tokyo (JP); Michihiro Hayashi, Tokyo (JP); Hideo Mitsudou, Tokyo (JP); Hisashi Kuwada, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 23 days.

(21) Appl. No.: 10/330,288

(22) Filed: Dec. 30, 2002

(65) Prior Publication Data

US 2004/0025850 A1 Feb. 12, 2004

(30) Foreign Application Priority Data

Aug. 9, 2002 (JP) ..................................... P 2002-232230

(51) Int. Cl.[7] .............................................. F02M 55/02
(52) U.S. Cl. ........................................ 123/509; 123/510
(58) Field of Search .............................. 123/509, 510, 123/516; 73/314, 313

(56) References Cited

U.S. PATENT DOCUMENTS

| 4,827,769 | A | * | 5/1989 | Riley et al. | .................... 73/313 |
| 5,022,263 | A | * | 6/1991 | Uriu et al. | ..................... 73/295 |
| 5,762,047 | A | * | 6/1998 | Yoshioka et al. | ........... 123/509 |
| 5,785,032 | A | * | 7/1998 | Yamashita et al. | .......... 123/509 |
| 6,138,524 | A | * | 10/2000 | Tsuda et al. | ............... 73/866.5 |
| 6,230,690 | B1 | * | 5/2001 | Umetsu | ...................... 123/509 |
| 2003/0074965 | A1 | * | 4/2003 | Okamoto | ..................... 73/313 |
| 2004/0123843 | A1 | * | 7/2004 | Kumagai et al. | ........... 123/509 |

FOREIGN PATENT DOCUMENTS

| JP | 2860846 | 12/1998 |
| WO | WO 96-23967 | 8/1996 |
| WO | 2000-73900 | 3/2000 |

* cited by examiner

Primary Examiner—Thomas Moulis
(74) Attorney, Agent, or Firm—Sughrue Mion, PLLC

(57) ABSTRACT

The fuel liquid level detection section 31 for detecting the liquid level of the fuel within the fuel tank 2 is provided within the housing casing 10 so as to cover the range from the full amount to the small remaining amount of the fuel within the fuel tank 2.

4 Claims, 4 Drawing Sheets

FUEL SUPPLY APPARATUS AND RESIDUAL FUEL AMOUNT INDICATION DEVICE FOR FUEL SUPPLY APPARATUS

BACKGROUND OF THE INVENTION

1. Field of the Invention

The present invention relates to a fuel supply apparatus for pressurizing and supplying fuel to an injector which is attached within the fuel tank of an automobile etc. and injects fuel to an engine, and also relates to a residual fuel amount indication device for the fuel supply apparatus.

2. Related Art

Conventionally, there is known an apparatus shown in the International Publication No. WO96/23967 as a fuel supply apparatus for supplying fuel to an internal combustion engine and also there is known an apparatus shown in the Unexamined Japanese Patent Application Publication No. 2000-73900 as another fuel supply apparatus.

FIG. 3 shows the side sectional view of the conventional fuel supply apparatus shown in the Unexamined Japanese Patent Application Publication No.2000-73900, and FIG. 4 is the circuit diagram of the conventional residual fuel amount indication device shown in the Japanese Patent No. 2,860,846.

In FIG. 3, a reference numeral 1 depicts a fuel supply apparatus which is integrally configured by a lid 3, a fuel pump 4, a fuel filter 5, a fuel pressure adjuster 6, a discharge pipe 7, a fuel liquid level gauge 8, the float 9 of the fuel liquid level gauge 8, a housing casing 10 serving as a supporting member for housing and supporting the fuel pump 4, the fuel filter 5 and the fuel pressure adjuster 6, a strainer 11 for filtering fuel sucked into the fuel pump 4, and an electric connector 12. The fuel supply apparatus is suspended from the opening portion 2a of a fuel tank 2 formed by metal or resin.

The fuel filter 5 is configured by a filter casing 5a formed by resin molded parts and a filter element 5b housed therein. The fuel filter 5 and the fuel pump 4 are coupled to each other through a coupling pipe 13.

The fuel filter 5 and the discharge pipe 7 are coupled to each other through a coupling pipe 14. The fuel pressure adjuster 6 is disposed on the way of the coupling pipe 14 so as to adjust fuel supplied to the injector to a predetermined pressure.

The fuel liquid level gauge 8 and the float 9 constituting a fuel liquid level detection section is configured in a manner that the fuel liquid level gauge 8 is attached to the outer peripheral surface of the housing casing 10 and, when the float 9 moves vertically or elevationally in accordance with the liquid level of the fuel within the fuel tank 2, a resistance value changes in accordance with the liquid level. The resistance value is set to be small when the fuel amount is large and set to be large when the fuel amount is small. A signal representing the resistance value is outputted to the outside through the electric connector 12 disposed on the upper surface of the lid 3 from a lead wire 15.

The fuel pump 4 is electrically coupled to the electric connector 12 through a lead wire 16 and supplied with electric power from a battery mounted on a not-shown vehicle.

A reference numeral 17 depicts a gasket for holding airtightness disposed between the lid 3 and the fuel tank 2.

The operation of the fuel supply apparatus 1 configured in the aforesaid manner will be explained with reference to FIG. 3.

When electric power is supplied to the not-shown motor of the fuel pump 4 from the not-shown battery through the electric connector 12 and the lead wire 16, the motor rotates and so fuel within the fuel tank 2 is sucked (in a direction shown by an arrow A) within the fuel pump 4 through the strainer 11. Thereafter, the fuel thus sucked is pressurized to a predetermined pressure and then discharged (in a direction shown by an arrow B).

The fuel thus discharged passes through the coupling pipe 13 and the filter element 5b of the fuel filter 5, then flows into the fuel pressure adjuster 6 (in a direction shown by an arrow C) and also is supplied to the injector of the fuel injection apparatus attached to the not-shown engine through the coupling pipe 14 and the discharge pipe 7.

In this case, the adjustor 6 is arranged in a manner that when the fuel pressure within the coupling pipe 14 becomes higher than the predetermined pressure, the fuel within the coupling pipe 14 is discharged into the housing casing 10 (in a direction shown by an arrow D) and then returned into the fuel tank 2 through a not-shown fuel path, whereby the pressure of the fuel discharged from the discharge pipe 7 is adjusted to be less than the predetermined pressure.

Next, the operation of the residual fuel amount indication device 20 configured in the aforesaid manner will be explained with reference to FIG. 4.

The fuel liquid level gauge 8 is applied with the voltage +B of the battery through a resistor 21. As a result, an output voltage V1 in inverse proportion to a fuel amount within the fuel tank 2 is obtained from a connection point between the fuel liquid level gauge 8 and the resistor 21. The output voltage V1 of the fuel liquid level gauge 8 is inputted into a damper circuit 24 formed by a resistor 22 and a capacitor 23.

The damper circuit 24 is provided in order to prevent such a phenomenon that an indicator representing the fuel amount moves finely and so the indication value varies in a short time due to the vibration of the vehicle etc. caused when the vehicle runs. A time constant $\tau$ of the damper circuit 24 determined by the value of the resistor 22 and the value of the capacitor 23 is fixed to a constant value regardless of the fuel amount.

The output of the damper circuit 24 is amplified in its voltage by an amplifier 25, then amplified in its current by a transistor 26 and inputted to one excitation coil 27A of an excitation coil 27 for moving the indicator representing the fuel amount.

The excitation coil 27 is configured by the one excitation coil 27A and the other excitation coil 27B generating magnetic fluxes in different directions, respectively. The one excitation coil 27A is excited by the output current from the emitter of the transistor 26, whilst the other excitation coil 27B is always coupled to the voltage +B through a resistor 28 and so always excited by the constant current due to the voltage +B. In this case, the excitation coil 27A is arranged to generate such magnetic flux of displacing the indicator in the E side (small fuel amount side).

According to the residual fuel amount indication device 20 configured in the aforesaid manner, the output voltage of the fuel liquid level gauge 8 is integrated by the time constant $\tau$ in the damper circuit 24 thereby to absorb the short-time variation of the output voltage of the fuel liquid level gauge 8 caused by the vibration of the vehicle.

Thereafter, the output of the damper circuit is amplified by the amplifier 25 and the transistor 26 and then applied to the excitation coil 27A. Thus, the output voltage V1 of the fuel liquid level gauge 8 becomes larger as the residual fuel amount becomes smaller, and the excitation current of the excitation coil 27A becomes larger as the output voltage V1 of the fuel liquid level gauge 8 becomes larger and so the indicator representing the fuel amount is driven to the E side.

In contrast, when the fuel amount within the fuel tank 2 is large, the excitation current of the excitation coil 27A becomes small. Thus, the magnitude of the magnetic flux of the excitation coil 27A becomes small, so that the indicator representing the fuel amount is driven to the F side (full fuel amount side) due to the influence of the magnetic flux generated by the other excitation coil 27B.

In the case of suspending the fuel supply apparatus 1 configured in the aforesaid manner from the opening portion 2a of the fuel tank 2, since the fuel liquid level gauge 8 attached to the outer peripheral surface of the housing casing 10 and the float 9 engaged with the fuel liquid level gauge 8 protrude largely from the outer peripheral surface of the housing casing 10, there arises a problem that the fitting procedure is difficult.

SUMMARY OF THE INVENTION

Accordingly, the invention has been made in order to solve the aforesaid problem, and an object of the invention is to provide a fuel supply apparatus which can be fitted easily into the opening portion of a fuel tank and suspended therefrom.

Further, another object of the invention is to provide a residual fuel amount indication device which can surely indicate a liquid level of the fuel within a fuel tank.

The fuel supply apparatus according to the invention is arranged to include:

a lid portion which is attached to an opening portion of a fuel tank and provided with a discharge pipe disposed therein;

a fuel pump which pressurizes fuel within the fuel tank and sends the fuel thus pressurized to an injector of an engine through the discharge pipe;

a fuel filter which filters the fuel discharged from the fuel pump;

fuel liquid level detection section which detects a liquid level of the fuel within the fuel tank; and a supporting member which is attached to the lid portion and supports the fuel pump, the fuel filter and the fuel liquid level detection section, wherein the fuel liquid level detection section is provided so as to cover a range from a full amount to a small remaining amount of the fuel within the fuel tank.

The fuel liquid level detection section is formed by a plurality of resistance variable elements.

A residual fuel amount indication device for a fuel supply apparatus is arranged to include:

a constant voltage circuit which holds a voltage of a battery to a predetermined voltage;

a liquid level voltage generation portion which is coupled to fuel liquid level detection section for detecting a liquid level of fuel within a fuel tank and generates a voltage based on the liquid level of the fuel;

a plurality of comparing circuits which compare the voltage outputted from the liquid level voltage generation portion with predetermined voltages to output signals based on comparison results thereof, respectively;

a plurality of switching circuits which perform switching operations in accordance with the signals outputted from the plurality of comparing circuits, respectively; and a plurality of liquid level indication portions which operate in accordance with the plurality of switching circuits, respectively.

Each of the liquid level indication portions is formed by a light emitting element which emits light in accordance with a liquid level of the fuel and a liquid level indication symbol which indicates the liquid level of the fuel.

The light emitting element is a light emitting diode.

DETAILED DESCRIPTION OF THE PREFERRED EMBODIMENTS (First Embodiment)

Figure 1:
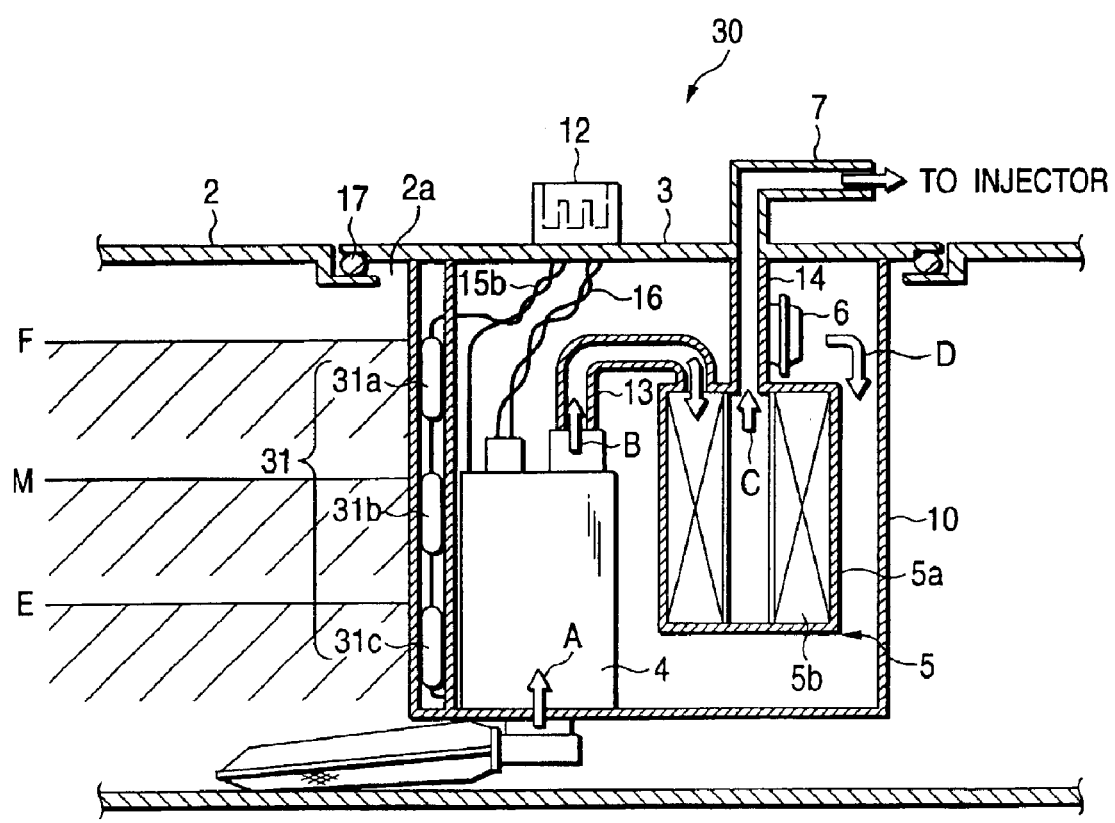
FIG. 1 is a side sectional view of the fuel supply apparatus according to the first embodiment of the invention.
Figure 2:
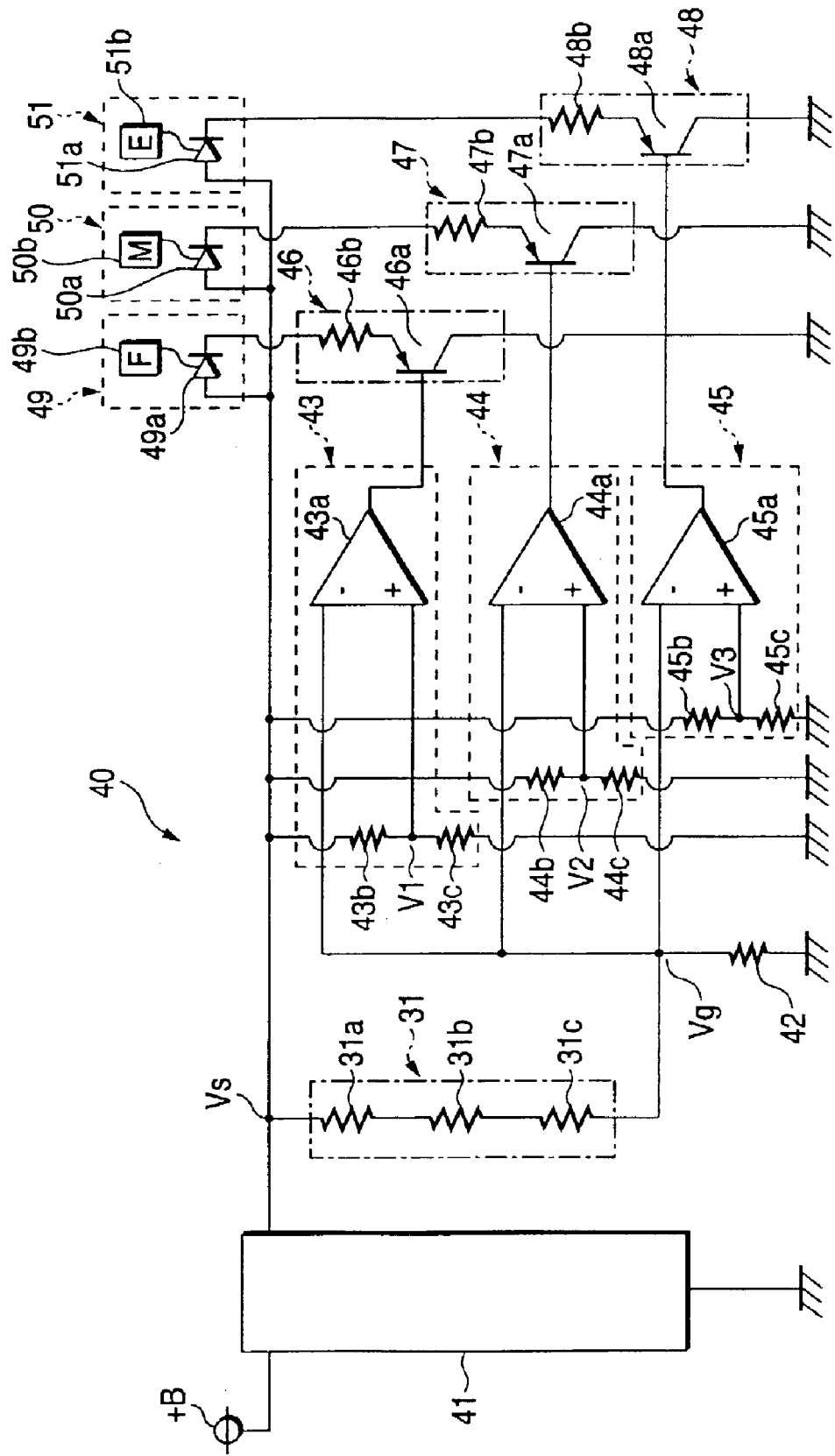
FIG. 2 is a circuit diagram of the residual fuel amount indication device according to the first embodiment of the invention.
Figure 3:
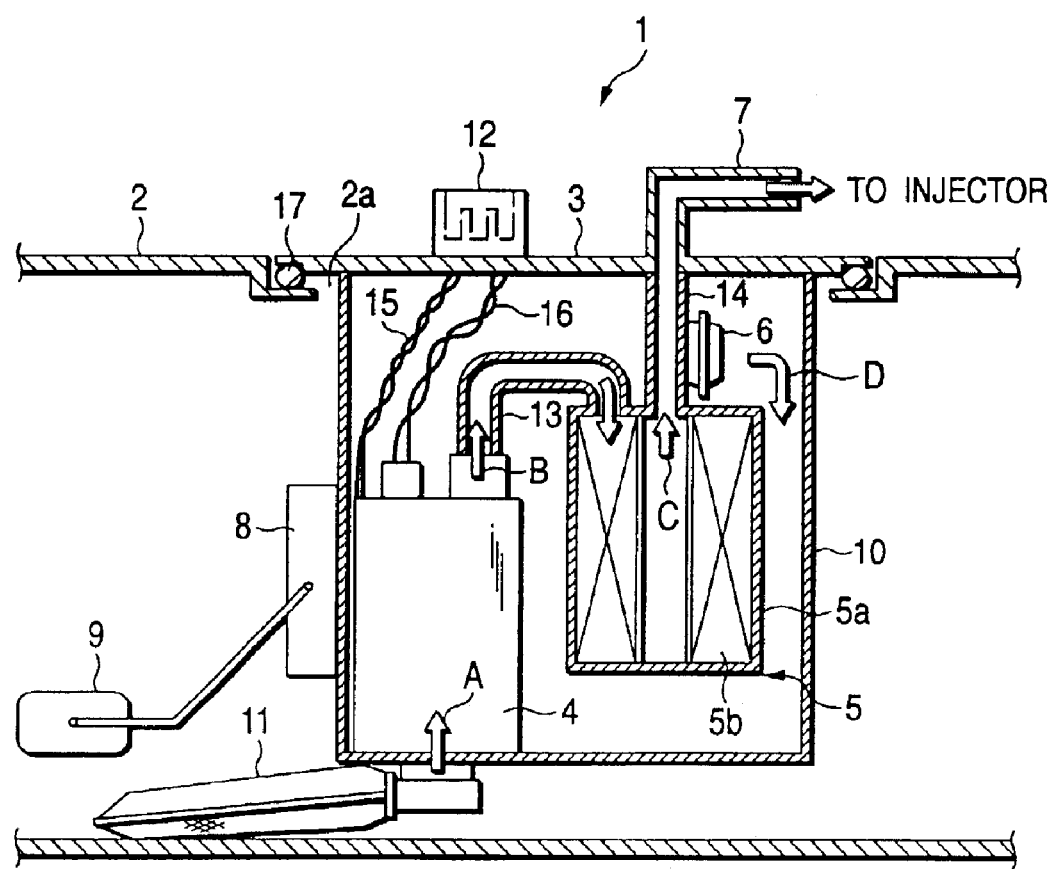
FIG. 3 is a side sectional view of the fuel supply apparatus.
Figure 4:
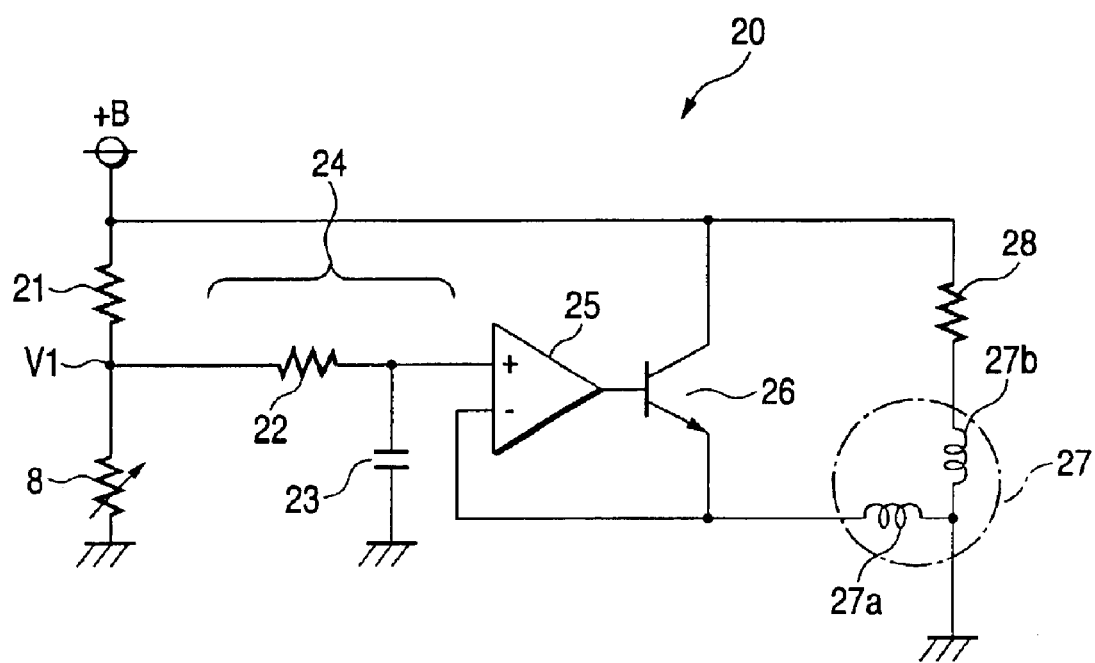
FIG. 4 is a circuit diagram of the conventional residual fuel amount indication device.

FIG. 1 is a side sectional view of the fuel supply apparatus according to the first embodiment of the invention, and FIG. 2 is a circuit diagram of the residual fuel amount indication device according to the first embodiment of the invention.

In FIG. 1, a reference numeral 30 depicts the fuel supply apparatus which is integrally configured by a lid 3, a fuel pump 4, a fuel filter 5, a fuel pressure adjuster 6, a discharge pipe 7, a resistance variable element portion 31, a housing casing 10 attached to the lid 3 and serving as a supporting member for housing and supporting the fuel pump 4, the fuel filter 5 and the fuel pressure adjuster 6, a strainer 11 for filtering fuel sucked into the fuel pump 4, and an electric connector 12. The fuel supply apparatus is suspended from the opening portion 2a of a fuel tank 2 formed by metal or resin.

The fuel filter 5 is configured by a filter casing 5a formed by resin molded parts and a filter element 5b housed therein. The fuel filter 5 and the fuel pump 4 are coupled to each other through a coupling pipe 13.

The fuel filter 5 and the discharge pipe 7 are coupled to each other through a coupling pipe 14. The fuel pressure adjuster 6 is disposed on the way of the coupling pipe 14 so as to adjust fuel supplied to the injector to a predetermined pressure.

The resistance variable element portion 31 serving as a fuel liquid level detection section is configured by the series connection of a first resistance variable element 31a formed by a PTC thermistor (having a positive temperature coefficient), for example, a second resistance variable element 31b and a third resistance variable element 31c which are provided at the outer peripheral portion of the housing casing 10 so as to cover the range from the full amount to the small remaining amount of the fuel within the fuel tank 2. When the liquid level of the fuel within the fuel tank 2 moves vertically of elevationally, the resistance variable element portion is soaked or exposed and so changes in its resistance value in accordance with the change of the liquid level of the fuel.

Incidentally, the first resistance variable element 31a, the second resistance variable element 31b and the third resistance variable element 31c may be connected in parallel by suitably selecting the resistance values thereof.

Further, the first resistance variable element 31a, the second resistance variable element 31b and the third resistance variable element 31c may be formed integrally.

Furthermore, the fuel liquid level detection section 31 may be a semiconductor element which is controlled in its conduction current when the fuel contacts therewith.

The resistance variable element portion 31 is connected in series with a liquid level voltage generation portion 42 (shown in FIG. 2) described later and then applied at its both terminals with a predetermined voltage. When the remaining amount of the fuel within the fuel tank 2 is small, all of the first resistance variable element 31a, the second resistance variable element 31b and the third resistance variable element 31c are exposed from the fuel, so that each of the first resistance variable element 31a, the second resistance variable element 31b and the third resistance variable element 31c is placed in a heat generation state and becomes to have a high resistance value. Thus, a current flowing into the liquid level voltage generation portion 42 becomes small and so a voltage generated from the liquid level voltage generation portion 42 becomes small.

In contrast, when the fuel within the fuel tank 2 is full, all of the first resistance variable element 31a, the second resistance variable element 31b and the third resistance variable element 31c are soaked in the fuel, so that each of the first resistance variable element 31a, the second resistance variable element 31b and the third resistance variable element 31c is placed in a cool state and becomes to have a small resistance value. Thus, a current flowing into the liquid level voltage generation portion 42 becomes large and so a voltage generated from the liquid level voltage generation portion 42 becomes large.

According to the aforesaid configuration, the voltage generated from the liquid level voltage generation portion 42 is outputted to the outside through the electric connector 12 disposed on the upper surface of the lid 3 from a lead wire 15b.

Further, the fuel pump 4 is electrically coupled to the electric connector 12 through a lead wire 16 and supplied with electric power from a battery mounted-on a not-shown vehicle.

A reference numeral 17 depicts a gasket for holding airtightness disposed between the lid 3 and the fuel tank 2.

The operation of the fuel supply apparatus 30 configured in the aforesaid manner will be explained with reference to FIG. 1.

When electric power is supplied to the not-shown motor of the fuel pump 4 from the not-shown battery through the electric connector 12 and the lead wire 16, the motor rotates and so fuel within the fuel tank 2 is sucked (in a direction shown by an arrow A) within the fuel pump 4 through the strainer 11. Thereafter, the fuel thus sucked is pressurized to a predetermined pressure and then discharged (in a direction shown by an arrow B).

The fuel thus discharged passes through the coupling pipe 13 and the filter element 5b of the fuel filter 5, then flows into the fuel pressure adjuster 6 (in a direction shown by an arrow C) and also is supplied to the injector of the fuel injection apparatus attached to the not-shown engine through the coupling pipe 14 and the discharge pipe 7.

In this case, the adjustor 6 is arranged in a manner that when the fuel pressure within the coupling pipe 14 becomes higher, the fuel within the coupling pipe 14 is discharged into the housing casing 10 (in a direction shown by an arrow D) and then returned into the fuel tank 2 through a not-shown fuel path, whereby the pressure of the fuel discharged from the discharge pipe 7 is adjusted to be less than the predetermined pressure.

Next, the explanation will be made as to the residual fuel amount indication device.

A reference numeral 40 depicts the residual fuel amount indication device, 41 a constant voltage circuit for holding the voltage of the battery to a predetermined voltage (Vs), and 42 a liquid level voltage generation portion which is connected in series with the resistance variable element portion 31 and generates a voltage (Vg) based on the liquid level of the fuel.

A reference numeral 43 depicts a first comparing circuit formed by a comparator 43a and resistors 43b and 43c which generate a threshold voltage to be compared with the voltage generated by the liquid level voltage generation portion 42, 44 a second comparing circuit formed by a comparator 44a and resistors 44b and 44c which generate a threshold voltage to be compared with the voltage generated by the liquid level voltage generation portion 42, and 45 a third comparing circuit formed by a comparator 45a and resistors 45b and 45c which generate a threshold voltage to be compared with the voltage generated by the liquid level voltage generation portion 42.

The threshold value (V1) for operating the comparator 43a is determined by a voltage dividing ratio between the resistor 43b and the resistor 43c, the threshold value (V2) for operating the comparator 44a is determined by a voltage dividing ratio between the resistor 44b and the resistor 44c, and the threshold value (V3) for operating the comparator 45a is determined by a voltage dividing ratio between the resistor 45b and the resistor 45c. These threshold values are set to be V1>V2>V3.

A reference numeral 46 depicts a first switching circuit formed by a transistor 46a and a resistor 46b for limiting the conduction current flowing into the transistor 46a, 47a second switching circuit formed by a transistor 47a and a resistor 47b for limiting the conduction current flowing into the transistor 47a and 48 a third switching circuit formed by a transistor 48a and a resistor 48b for limiting the conduction current flowing into the transistor 48a.

A reference numeral 49 depicts a first liquid level indication portion formed by a light emitting element 49a for emitting light in accordance with the liquid level of the fuel and a liquid level indication symbol F indicating the liquid level of the fuel, 50 a second liquid level indication portion formed by a light emitting element 50a for emitting light in accordance with the liquid level of the fuel and a liquid level indication symbol M indicating the liquid level of the fuel, and 51 a third liquid level indication portion formed by a light emitting element 51a for emitting light in accordance with the liquid level of the fuel and a liquid level indication symbol E indicating the liquid level of the fuel.

Next, the operation of the residual fuel amount indication device 40 configured in the aforesaid manner will be explained.

(1) When the voltage (+B) of the battery is inputted into the constant voltage circuit 41, which in turn generates the voltage (Vs) held at the predetermined value.

(2) When the voltage Vs is applied between the both end terminals of the resistance variable element portion 31 and the liquid level voltage generation portion 42 connected in series with the resistance variable element portion 31, a predetermined current flows through the first resistance variable element 31a, the second resistance variable element 31b and the third resistance variable element 31c, whereby the respective resistance variable elements generate heat.

(3) When the fuel within the fuel tank 2 is full (the position F in FIG. 1), all of the first resistance variable element 31a, the second resistance variable element-31b and the third resistance variable element 31c are soaked in the fuel, so that each of the first resistance variable element 31a, the second resistance variable element 31b and the third resistance variable element 31c is placed in a cool state and becomes to have a small resistance value. Thus, a current flowing into the liquid level voltage generation portion 42 becomes large and so a voltage (Vg) generated from the liquid level voltage generation portion 42 becomes large.

(4) The voltage (Vg) generated from the liquid level voltage generation portion 42 is set to be larger than the threshold value (V1) of the first comparing circuit 43, so that the comparator 43a operates and the output voltage thereof changes from a high voltage to a low voltage.

(5) When the base voltage of the transistor 46a of the first switching circuit 46 becomes the low voltage, a current flows through the light emitting element 49a of the first liquid level indication portion 49 and the resistor 46b due to the voltage (Vs) outputted from the constant voltage circuit 41, so that the light emitting element 49a emits light.

(6) In the similar manner, the voltage (Vg) generated from the liquid level voltage generation portion 42 is larger than the threshold value (V2) of the second comparing circuit 44 and the threshold value (V3) of the third comparing circuit 45, so that the comparator 44a and the comparator 45a operate and so the output voltage of each of these comparators changes from a high voltage to a low voltage.

(7) As a result, the base voltage of the transistor 47a of the second switching circuit 47 becomes the low voltage, so that a current flows through the light emitting element 50a of the second liquid level indication portion 50 and the resistor 47b due to the voltage (Vs) outputted from the constant voltage circuit 41, whereby the light emitting element 50a emits light. Further, the base voltage of the transistor 48a of the third switching circuit 48 becomes the low voltage, so that a current flows through the light emitting element 51a of the third liquid level indication portion 51 and the resistor 48b due to the voltage (Vs) outputted from the constant voltage circuit 41, whereby the light emitting element 51a emits light.

(8) In the aforesaid manner, when the fuel within the fuel tank 2 is full, all of the light emitting element 49a on which the liquid level indication symbol F (full) 49b is indicated, the light emitting element 50a on which the liquid level indication symbol M (middle) 50b is indicated and the light emitting element 51a on which the liquid level indication symbol E (empty) 51b is indicated emit light.

(9) When the liquid level of the fuel within the fuel tank 2 reduces to the position M (shown in FIG. 1), the first resistance variable element 31a is exposed from the fuel, so that the first resistance variable element 31a is placed in a heat generation state and becomes to have a high resistance value. Thus, a current flowing into the liquid level voltage generation portion 42 becomes small and so the voltage (Vg) generated from the liquid level voltage generation portion 42 reduces.

(10) When the voltage (Vg) generated from the liquid level voltage generation portion 42 reduces and becomes smaller than the threshold value (V1) of the first comparing circuit 43, the comparator 43a becomes inoperative and so the output signal thereof changes from the low voltage to the high voltage.

(11) When the base voltage of the transistor 46a of the first switching circuit 46 becomes the high voltage, the transistor 46a becomes nonconductive, so that the light emitting element 49a of the first liquid level indication portion 49 on which the liquid level indication symbol F (full) 49b is indicated stops the light emission.

In this state, since there is a relation that Vg>V2>V3, the light emitting element 50a on which the liquid level indication symbol M (middle) 50b is indicated and the light emitting element 51a on which the liquid level indication symbol E (empty) 51b is indicated continue to emit light.

(12) Further, when the liquid level of the fuel within the fuel tank 2 reduces to the position E (shown in FIG. 1), the second resistance variable element 31b is exposed from the fuel, so that the second resistance variable element 31b is placed in a heat generation state and becomes to have a high resistance value. Thus, a current flowing into the liquid level voltage generation portion 42 becomes further smaller and so the voltage (Vg) generated from the liquid level voltage generation portion 42 is reduced.

(13) When the voltage (Vg) generated from the liquid level voltage generation portion 42 reduces and becomes smaller than the threshold value (V2) of the second comparing circuit 44, the comparator 44a becomes inoperative and so the output signal thereof changes from the low voltage to the high voltage.

(14) When the base voltage of the transistor 47a of the second switching circuit 47 becomes the high voltage, the transistor 47a becomes nonconductive, so that the light emitting element 50a of the second liquid level indication portion 50 on which the liquid level indication symbol M (middle) is indicated stops the light emission.

In this state, since there is a relation that Vg>V3, the light emitting element 51a on which the liquid level indication symbol E (empty) is indicated continue to emit light.

(15) Further, when the liquid level of the fuel within the fuel tank 2 reduces and the third resistance variable element 31c is exposed from the fuel, the light emitting element 51a on which the liquid level indication symbol E (empty) 51b is indicated also stops the light emission thereby to indicate that the fuel remaining within the fuel tank 2 is small and so the fuel can not be discharged to the injector by the fuel pump 4.

In the aforesaid embodiment, although the explanation has been made as to the case where the fuel supply apparatus 30 is suspended from the upper surface of the fuel tank 2, the liquid level of the fuel within the fuel tank 2 can be detected by providing the resistance variable element portion 31 within the housing casing 10 in the similar manner even in the case of attaching the fuel supply apparatus from the lower surface of the fuel tank 2.

The fuel supply apparatus according to the first embodiment of the invention is arranged in the aforesaid manner. Thus, in the case of suspending the fuel supply apparatus from the opening portion of the fuel tank, since the fuel liquid level detection section for detecting the liquid level of the fuel within the fuel tank is provided within the housing casing so as to cover the range from the full amount to the small remaining amount of the fuel within the fuel tank, unlike the conventional fuel liquid level gauge and the float, the fuel liquid level detection section does not largely protrude from the housing casing and so the fitting procedure can be performed easily.

According to the residual fuel amount indication device according to the first embodiment of the invention, the liquid level of the fuel within the fuel tank can be surely indicated based on the signal from the fuel liquid level detection section for detecting the liquid level of the fuel within the fuel tank.

According to the invention as in aspect 1, the fuel supply apparatus according to the invention is arranged to include: the lid portion which is attached to the opening portion of the fuel tank and provided with the discharge pipe disposed therein; the fuel pump which pressurizes fuel within the fuel tank and sends the fuel thus pressurized to the injector of the engine through the discharge pipe; the fuel filter which filters the fuel discharged from the fuel pump; the fuel liquid level detection section which detects a liquid level of the fuel within the fuel tank; and the supporting member which is attached to the lid portion and supports the fuel pump, the fuel filter and the fuel liquid level detection section, wherein the fuel liquid level detection section is provided so as to cover a range from a full amount to a small remaining amount of the fuel within the fuel tank. Thus, the fuel liquid level detection section does not largely protrude from the housing casing and so the fitting procedure can be performed easily.

According to the invention as in aspect 2, the fuel liquid level detection section is formed by a plurality of resistance variable elements. Thus, the liquid level of the fuel within the fuel tank can be detected accurately.

According to the invention as in aspect 3, the residual fuel amount indication device for the fuel supply apparatus is arranged to include: the constant voltage circuit which holds the voltage of the battery to the predetermined voltage; the liquid level voltage generation portion which is coupled to fuel liquid level detection section for detecting the liquid level of fuel within the fuel tank and generates the voltage based on the liquid level of the fuel; the plurality of comparing circuits which compare the voltage outputted from the liquid level voltage generation portion with predetermined voltages to output signals based on comparison results thereof, respectively; the plurality of switching circuits which perform switching operations in accordance with the signals outputted from the plurality of comparing circuits, respectively; and the plurality of liquid level indication portions which operate in accordance with the plurality of switching circuits, respectively. Thus, the liquid level of the fuel within the fuel tank can be surely indicated based on the signal from the fuel liquid level detection section for detecting the liquid level of the fuel within the fuel tank.

According to the invention as in aspect 4, each of the liquid level indication portions is formed by the light emitting element which emits light in accordance with the liquid level of the fuel and the liquid level indication symbol which indicates the liquid level of the fuel. Thus, the liquid level of the fuel being indicated can be recognized easily.

According to the invention as in aspect 5, the light emitting element is a light emitting diode. Thus, the visibility of the indicated level is good.

What is claimed is:

1. A fuel supply apparatus comprising:
   a lid portion which is attached to an opening portion of a fuel tank and provided with a discharge pipe disposed therein;
   a fuel pump which pressurizes fuel within said fuel tank and sends the fuel thus pressurized to an injector of an engine through said discharge pipe;
   a fuel filter which filters the fuel discharged from said fuel pump;
   a fuel liquid level detection section which detects a liquid level of the fuel within said fuel tank; and
   a supporting member which is attached to said lid portion, houses said fuel pump and said fuel filter, and supports said fuel liquid level detection section, wherein
   said fuel liquid level detection section is provided so as to cover a range from a full amount to a small remaining amount of the fuel within said fuel tank.

2. The fuel supply apparatus according to claim 1, wherein said fuel liquid level detection section comprises:
   a plurality of resistance variable elements.

3. The fuel supply apparatus according to claim 1, wherein the fuel liquid level detection section comprises at least two thermistors.

4. The fuel supply apparatus according to claim 1, wherein the thermistor has positive temperature coefficient.

* * * * *